Nov. 28, 1961 R. B. McCLOSKY 3,010,265
PACKAGING MACHINE
Filed Aug. 20, 1957 3 Sheets-Sheet 3
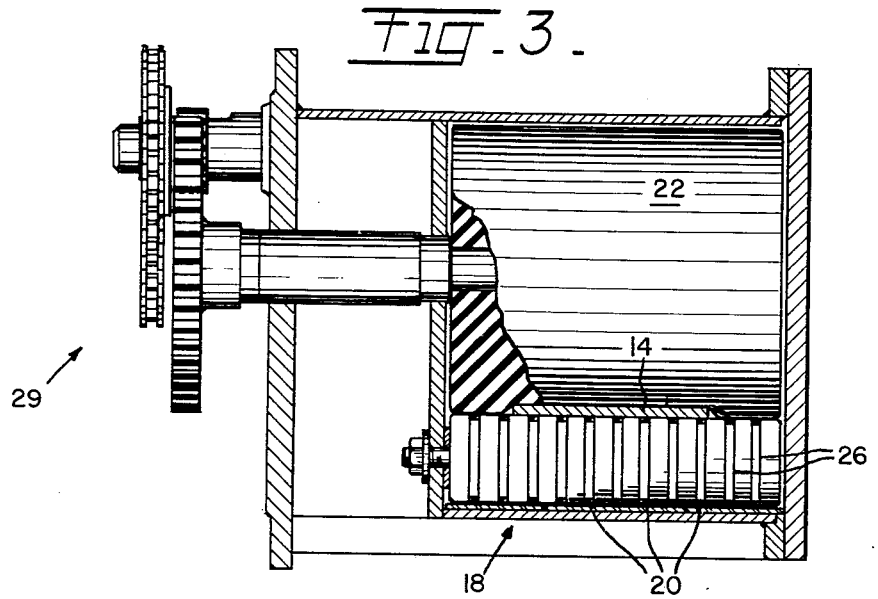
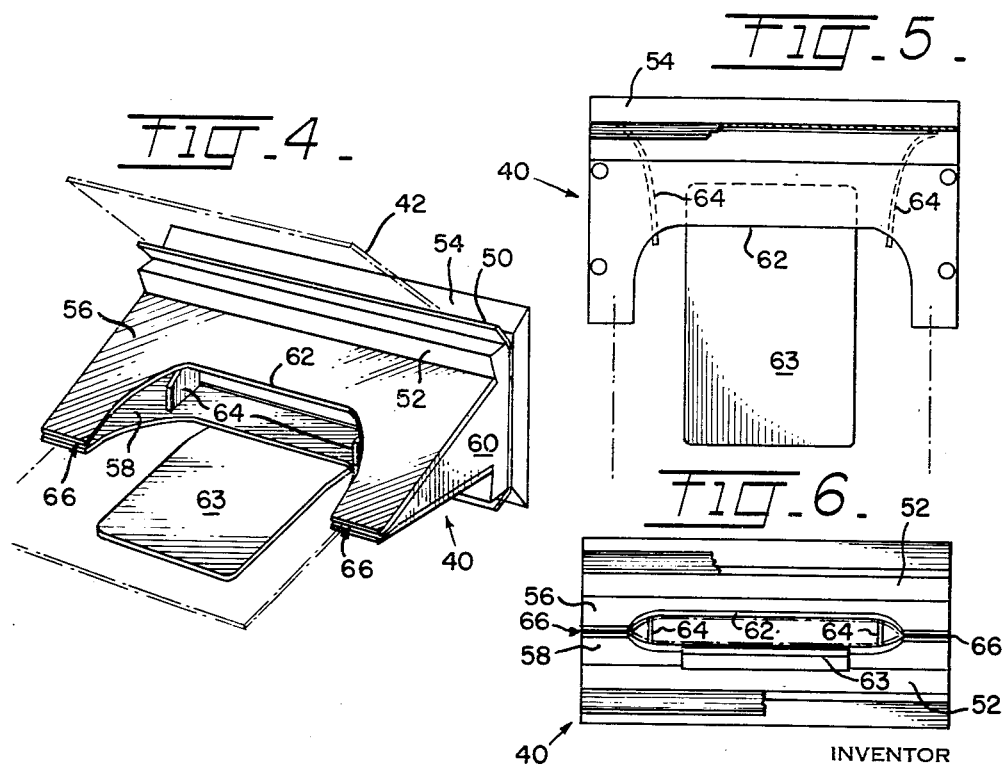
INVENTOR
ROBERT B. McCLOSKY
BY
Curtis, Morris & Safford
ATTORNEYS 3,010,265
PACKAGING MACHINE
Robert B. McClosky, Montvale, N.J., assignor to Roto Wrap Machine Corporation, Englewood, N.J., a corporation of New Jersey
Filed Aug. 20, 1957, Ser. No. 679,248
15 Claims. (Cl. 53—112)

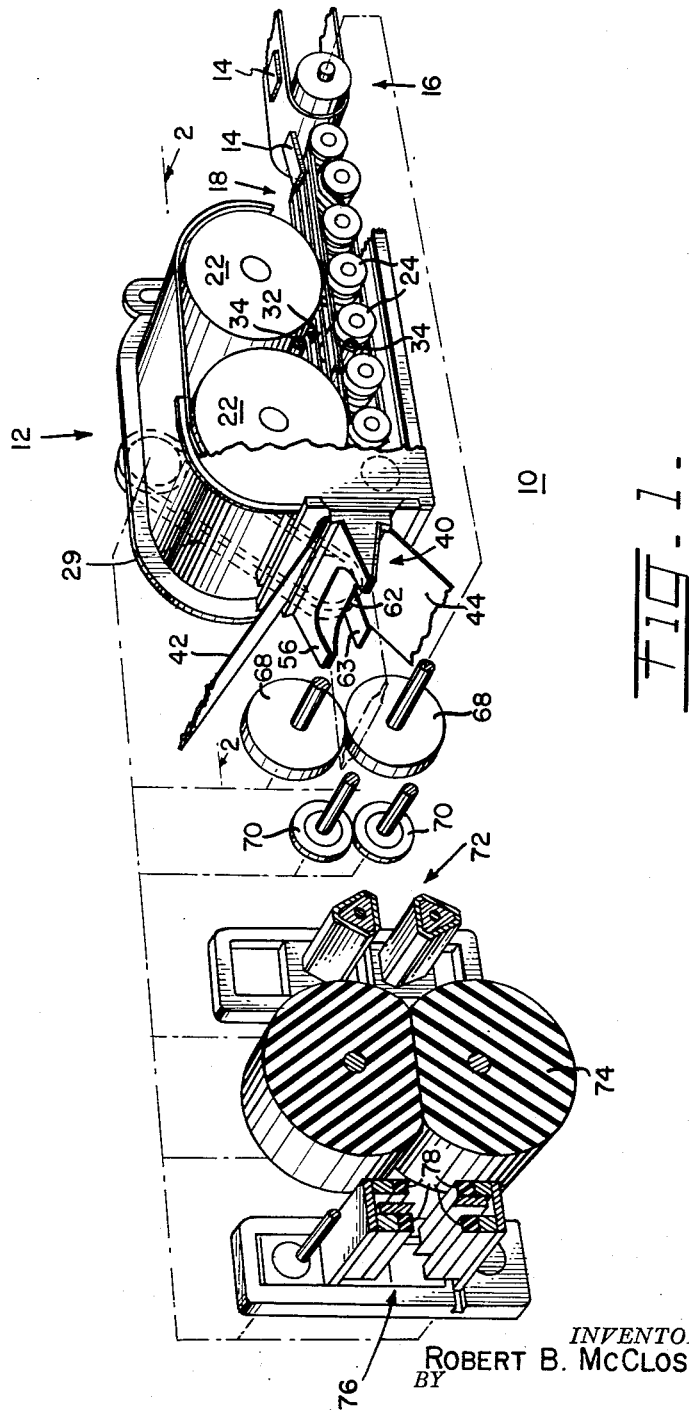

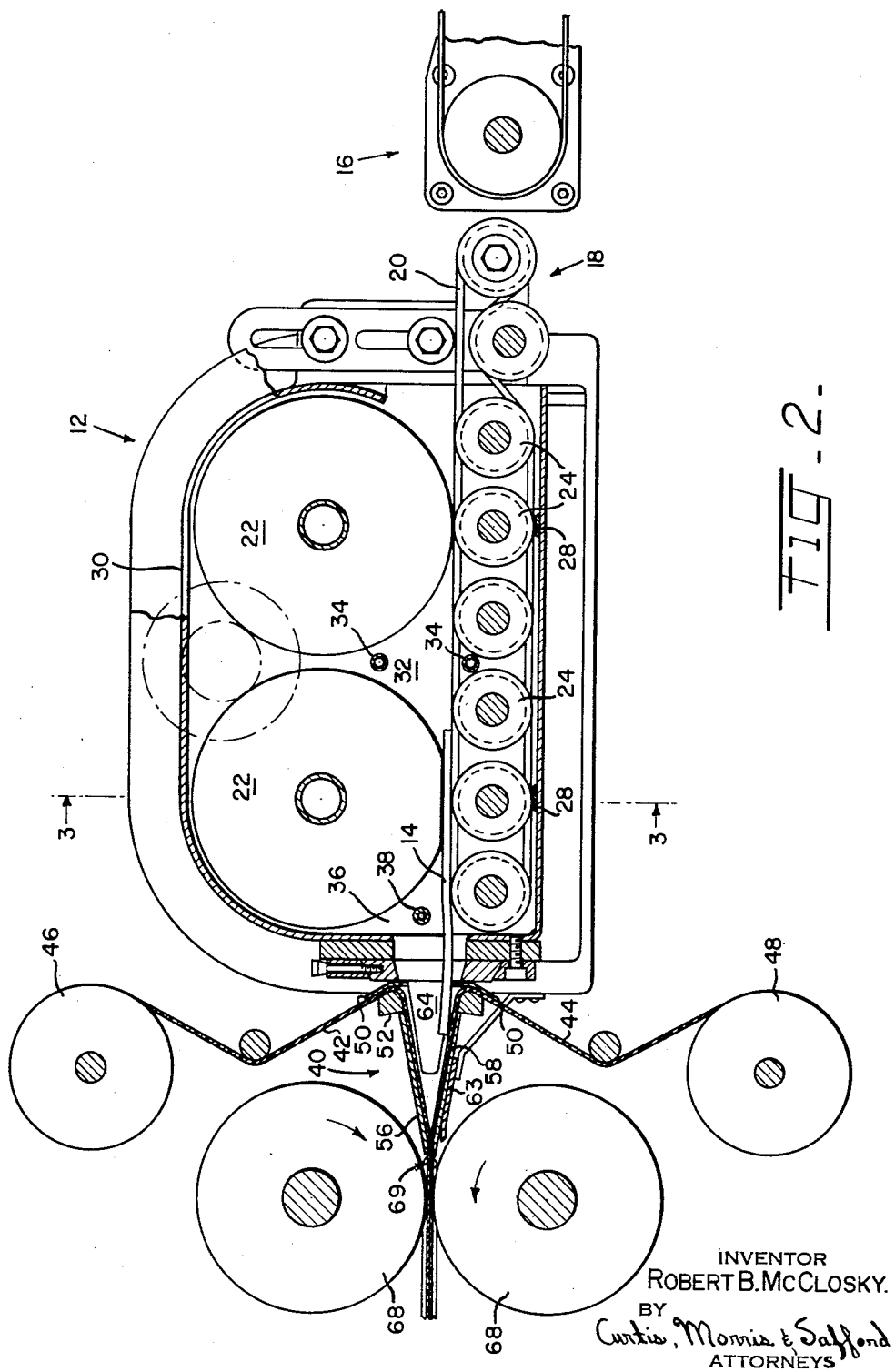

This invention relates to a machine for wrapping and sealing articles, such as slices of food, inside inert-gas filled packages, and more particularly it relates to a machine for continuously wrapping and sealing such articles in gas-tight packages.

An object of this invention is to provide a relatively simple and inexpensive machine for wrapping and sealing food products, such as cheese slices, in envelope-shaped packages of gas-tight film material, such as plastic or foil, and having an oxygen-free inert gas atmosphere.

Another object is to provide a machine of this kind which operates continuously and at high speed.

A further object is to provide such a machine which is small and self-contained and which operates at atmospheric pressure rather than under vacuum.

In handling certain kinds of foods such as sliced cheese or meat, it has been found that they can be kept in prime condition for much longer periods of time if kept under ordinary refrigeration in an oxygen-free atmosphere of inert gas. The improvement in the storageability of these foods under such conditions is remarkable; moulding, discoloration, deterioration in taste and drying out are practically eliminated during the ordinary keeping times of these foods. This greatly increases their salability and at the same time reduces waste to the vanishing point. Naturally, therefore, there is a pressing demand throughout the industry, and particularly in connection with the distribution through self-service markets to the customer of ready-packed sliced meat, cheese and the like, for a simple and inexpensive way of packaging these foods to effectively exclude all oxygen.

Foods of this kind are widely distributed and sold in thin envelope-shaped bags of plastic or foil material, known in the trade as fin-type packages, and these usually include transparent film for most effective display of their contents. These packages permit easy and sanitary handling of food and they are lightweight and inexpensive. The present invention seeks to combine the many advantages of this kind of package with the advantages to be gained from surrounding the food with a dry, inert gas.

In the past there have been various attempts to manufacture fin-type, oxygen-free packages on a commercial basis. Completely evacuating the packages and then sealing them was one approach but this was not entirely practical for several reasons. For one thing, the packages had a withered and drawn look and their contents tended to be crushed by the pressure of the atmosphere. Also they leaked with even the slightest puncture and so required careful handling if they were to maintain their imperviousness to outside oxygen.

To overcome this difficulty with vacuum packages, others have been filled with a suitable gas, such as nitrogen, which counteracts the pressure of the atmosphere and at the same time gives the benefits of an oxygen-free atmosphere. The problem with these gas filled packages however has been the difficulty of removing the oxygen in them in the first place and then sealing them, filled with the inert gas, without allowing air to leak in during the process. The present invention provides a practical solution to this problem.

In accordance with the present invention there is provided a relatively simple and inexpensive machine which can produce on a continuous basis gas-filled packages of the kind described above. The machine accepts food slices and the like fed into it from the ordinary room atmosphere and then flushes these articles substantially free of all oxygen. It leads the air-free articles one-by-one between two continuous narrow strips of wrapping film, such as cellophane coated with thin layers of saran and polyethylene, which are similarly flushed and then sealed into a continuous, inert gas filled tube with the articles lying within it at spaced intervals. Finally, this tube is sealed and cut along transverse lines to obtain individual packages.

Because the atmospheric oxygen is removed by cleaning individually before assembly all of the components of each package produced by this machine rather than by first forming the packages, filling them with food, then evacuating them of all air and finally filling with inert gas, no part of the machine need operate at less than atmospheric pressure. This entirely does away with the difficulties involved with vacuum systems and moreover permits a much higher rate of production. The air scavenging action in this machine is exceptionally efficient and removes all but a few molecules of oxygen from each package produced. The machine, for a given rate of production can be made surprisingly small in size, and the packages produced, taking into account the cost of buying and operating the machine, are only slightly more expensive than ordinary air-filled packages of the same kind.

A better understanding of the invention together with a fuller appreciation of its many advantages will best be gained from the following description given in connection with the accompanying drawings in which:

FIGURE 1 is a perspective view of a machine embodying features of the invention and shown for better illustration with certain parts broken away and others moved apart slightly from their actual position;

FIGURE 2 is an enlarged longitudinal section view taken as indicated by lines 2—2 in FIGURE 1;

FIGURE 3 is a cross-section view taken as indicated by lines 3—3 in FIGURE 2;

FIGURE 4 is a perspective view of a portion of the machine;

FIGURE 5 is a top view of the structure seen in FIGURE 4; and

FIGURE 6 is a front view of the structure in FIGURE 4.

The machine 10 in FIGURE 1 comprises an inert gas-filled air scrub-off mechanism 12, shown with top, cover, and front side removed, into which articles 14, such as sliced cheese, are fed from the right by a conventional conveyor 16. Articles 14 are equally spaced on this conveyor and are supplied to mechanism 12 by it in timed sequence with the operation of the machine.

Just before articles 14 enter the scrubbing mechanism they are transferred to a second conveyor 18 which carries them supported on laterally spaced longitudinally moving strands 20, seen also in FIGURE 3, so that the articles are in contact with the supporting structure over the least possible area and are consequently exposed to the inert gas on all sides. Riding on the strands of conveyor 18, the articles move to the left into mechanism 12 entering beneath a first one of two large and very flexible foam rubber rollers 22 which (see FIGURE 3) are able to conform exactly over the top and sides of the articles and which while permitting them to pass, exclude air from the interior of the scrubbing mechanism. This mechanism, it is to be understood, is effectively gas-tight and has a top, two sides and a bottom cover which are fitted together to form an integral housing with entrance and exit openings respectively at the right and left ends of conveyor 18.

The strands 20 of conveyor 18 are supported by the parallel rollers 24 journalled in the frame of mechanism 12 and having around their circumference (see FIGURE 3) the grooves 26 in which these strands fit. Grooves 26 are just deep enough for the top of the strands to lie flush with the surface of each roller. Thus, as seen in FIGURE 2, the first or right-hand flexible roller 22, when there is no article beneath it, touches the top surface of the roller 24 beneath it and makes a gas-tight seal. The bottom surface of this roller 24 and the roller 24 beneath the other roller 22 are gas sealed against the elastic strips 28 cemented to the bottom cover of mechanism 12.

Just above flexible rollers 22 and curved closely around them on the right and left as seen in FIGURE 2, is a thin shield 30 which together with these rollers, the rollers 24 beneath them, and strips 28 effectively seal a central space or chamber 32 within mechanism 12. Pure nitrogen gas, or any other suitable gas, is continuously pumped into this first chamber at a pressure slightly above atmospheric, and by escaping slowly to the outside constantly scavenges any oxygen which may have been brought in with each article.

The nitrogen gas is sprayed into chamber 32 above and below the upper run of conveyor 18 across its width by the transverse and parallel pipe-like nozzles or spray bars having closely spaced pin holes 34, seen also in FIGURE 1. Passing between these nozzles, the articles are thoroughly washed clean on all sides of any air that may be clinging to them.

After receiving a thorough scrubbing in chamber 32, the articles next pass beneath the second or left-hand roller 22 and into a second chamber 36 which also is filled with nitrogen gas. The gas in this chamber is supplied from two side outlets 38, one of which is seen in FIGURE 2, at a pressure just slightly above that of the gas in the first chamber. Any leakage therefore will be from chamber 36 to chamber 32, and from chamber 32 to the outside.

Positioned forward of chamber 36 is the prow-shaped and effectively gas-tight strip former 40, seen also in FIGURES 4, 5 and 6, into which the articles 14 are advanced and from which they emerge covered by the two endless thin wrapping strips 42 and 44. Each of these strips is drawn from the respective one of the supply rolls 46, 48 and led from the outside into the strip former through the slit guides 50 over the bars 52 into its nitrogen gas filled interior. Upon entering the strip former, the strips are pulled to the left, as seen in FIGURE 2, and brought face-to-face with their side edges together. The openings in guides 50 are just slightly wider than enough for the entry of strips 42 and 44 so that the gas within former 40 can flow out along the surfaces of the strips and scrub them free of air.

As the strips are drawn to the left, lower strip 44 picks up and conveys the articles 14 in turn as they leave the left end of conveyor 18. These strips in the form of a flat oval tube are continuously drawn through the forward end of former 40 and are sealed first along their side edges and then along transverse lines between the articles.

Former 40 consists of a base plate 54 fastened to the frame of mechanism 12 and in turn supporting bars 52 and the upper and lower plates 56 and 58 which almost but not quite come together at their forward edges. Side fillets 60 welded between plates 56 and 58 and to base 54 complete the former so that it is effectively gas-tight.

The forward edges of plates 56 and 58 are trimmed back in their center portions 62 as shown in FIGURES 4 and 5 to provide clearance for articles 14 moving out of former 40 between strips 42 and 44. Projecting forward beneath the center portion of lower plate 58 is a support tongue 63 which is supported in cantilever fashion from the frame of mechanism and prevents undesirable sag in strips 42 and 44 in this region.

To keep the side edges of these strips even with each other as they move through the strip former there are positioned between former plates 56 and 58 as seen in FIGURES 4 and 5 and 6 two curved side rails or fingers 64. These fingers are supported at their rear ends on base 54 of the former and are positioned between strips 42 and 44, thus pressing strips 42 up against plate 56 and strip 44 down against plate 58. The fingers are tapered toward the front and are curved slightly toward each other to funnel or guide articles 14 to the center of the strips before they are drawn from the strip former. Together with the cutout portion 62, the fingers impart a cross-sectional shape to strips 42 and 44 as indicated by the dotted lines in FIGURE 6. The edges of the strips are held face-to-face in the narrow slits 66 defined by the frontmost portions of plates 56 and 58.

As seen best in FIGURE 2 and also indicated in FIGURE 1, positioned just forward of the front edges of former plates 56 and 58 are a pair of sealing wheels 68 which roll in contact with one side edge of strips 42 and 44 and heat-seal them together. A similar pair of wheels (not shown) roll in contact with the other side edge of these strips and seal it. These wheels can be similar to those shown in co-pending application Serial No. 593,505, filed June 25, 1956.

Where the strips emerge from the former, as seen in FIGURE 2, there is a small but finite gap 69 between the sealing wheels 68 and the strip former across which the edges of the strips are unsealed. However, because of the higher than atmospheric pressure of the nitrogen within the strips, there will be an outward flow of nitrogen gas in the region of gap 69 and this will prevent any oxygen from leaking in. After strips 42 and 44 are sealed along their edges there of course is no chance for air to leak in. It will be appreciated that the pressure within the strips forward of wheels 68 and before the first transverse sealer, still to be described, is also somewhat higher than atmospheric.

With reference to FIGURE 1, pulling the sealed strips 42 and 44 forward past sealing wheels 68 are the pressure wheels 70, a pair on each side of the strips, which also squeeze the bonded seam along each side to insure further a perfect seal. Forward of wheels 70 are the triangular-shaped transverse sealing bars 72 mounted for rotation to come together into engagement with the moving strips, move along with them to the left for a short distance and while doing so to heat-seal them along a transverse line, and then to move apart and rotate on to repeat this operation with the next transverse line to be sealed. An alternative strucure for bars 72 can be as described in the above identified co-pending application.

Positioned forward of sealing bars 72 are a pair of super-flexible rollers 74 which press against the strips 42 and 44 and which while moving them forward gently squeeze the excess gas in them to the rear, i.e. to the right in FIGURE 1. These super-flexible rollers 74 squeeze gas from between the strips prior to the sealing of the fourth side of each package by the transverse sealing means 72. As the strips move forward beneath these rollers, the portion which was just sealed transversely by bars 72 advances until it comes beneath the eccentric shears generally indicated at 76. At the proper moment these shears come together with an eccentric closing and forward moving motion, such as described in the aforementioned patent application, and sever the strip into a separate sealed package. Upon the closing of shears 76 the pressure pads 78 carried on each side of the shear blades firmly squeeze the strips on each side of the cut-line and thus further insure a gas-tight seal between the strip faces adjacent this line. Shears 76 and sealing bars 72 are synchronized with each other and with the remainder of the machine, the spacing between the shears and bars is set according to the length of the packages desired.

Finished packages are discharged from shears 76 to the left to a collection bin not shown.

In the machine described above, all components of the packages produced are supplied from outside of the machine in ordinary room atmosphere. Thus, specialized pre-treatment of these components is eliminated. Even so, and in spite of the relatively small and uncomplicated structure and the high speed of this machine, its efficiency is such that in the finished packages there is less than 0.4% oxygen.

The above description of the invention is intended in illustration and not in limitation thereof. Various changes may occur to those skilled in the art and these may be made without departing from the spirit or scope of the invention as set forth.

I claim:

1. A high-speed, low-cost packaging machine adapted for continuous operation in ordinary room atmosphere comprising a scrubbing mechanism defining at least one gas tight chamber, conveyor means for carrying articles into said chamber single file, a source of pressurized inert gas, nozzle means being connected to said source for spraying inert gas within said chamber over said articles as they move past to scrub them free of any air clinging to them, a gas tight strip forming member positioned at the forward end of said scrubbing mechanism and having a wedge-shaped interior narrowing toward the front, said pressurized inert gas being fed into said forming member, said former member having upper and lower surfaces converging toward a pair of laterally spaced narrow slit-like openings therebetween for passing the articles therethrough, said forming member being adapted to receive articles from said chamber and to receive two spaced apart strips of wrapping film and to guide them along said converging upper and lower surfaces said scrubbing mechanism having a pair of openings, one of said strips passing through each of said openings into the scrubbing mechanism, a portion of said pressurized inert gas escaping from each of said openings adjacent to the strip to scrub the strip free of air before entrance into said mechanism, means to guide said articles centrally along and between said strips as the strips are advanced longitudinally out of the forward end of said former face-to-face in a flat oval tube with the respective edges of said strips being brought together by the respective slit-like openings, a first and a second pair of side sealing wheels external to said forming member and engaging the edges of the strips closely adjacent to said slit-like openings for sealing the respective edges together after they have been discharged from said former, the pressure of the gas within said former being above atmospheric for producing an outward flow of inert gas between the side edges of the strips for excluding air, and transverse sealing means following said edge sealing means for completing the sealing of said strips along four sides to form gas filled generally rectangular packages.

2. The structure as in claim 1 wherein said sealing means includes side pairs of continuously rotating heat sealing wheels positioned external to and closely in front of the forward end of said strip former and adapted to press together and heat-seal the side edges of said strips as they pass from within said former, and further includes a pair of transverse heat sealing means mounted to come together and heat seal said strips along transverse lines as said strips move forward, and in further combination with means for removing excess gas from each of said packages prior to the completion of the sealing of its fourth side by said transverse heat sealing means.

3. A high-speed, low-cost packaging machine adapted for continuous production in ordinary room atmosphere of fin-type gas-filled packages, said machine comprising a housing defining a first and a second gas tight chamber each having entrance and exit openings, means positioned across the entrance opening into said first chamber to seal it from the outside air but to permit the entrance of articles, means positioned between said first and second chambers to prevent appreciable gas flow between them but to permit articles to pass, a strip-forming member positioned across the exit opening from said second chamber and adapted to receive articles therefrom, said member having a wedge shaped interior with a narrow slit-like opening in its front and being cut back around the central part of said opening to provide clearance for said articles in passing through said former, means to supply a first and a second strip of sealing film to said former on opposite sides thereof, said strips being supplied to the rear of said former and passing through it out of said slit-like opening being brought together face to face and distended in a flat oval tube with said articles centered within it, gas supply means for supplying inert gas to said chamber at a pressure above atmospheric, and sealing means positioned immediately adjacent the front end of said strip forming member for sealing at least the side edges of said strip.

4. The structure as in claim 3 wherein said housing includes a base cover, a top and two sides tightly joined together, two spaced-apart and very flexible rollers mounted within said housing athwart the entrance and exit openings of said first chamber, a top shield positioned closely adjacent said rollers and curved part way around their ends, and in further combination with an endless belt conveyor positioned immediately beneath said rollers and adapted to convey articles into said housing and through said chambers, and means for sealing between the bottom cover of said housing and said endless belt conveyor.

5. The structure as in claim 3 wherein said strip-forming member comprises a base having a large central opening in it and is attached to said housing over the exit opening from said second chamber, a top and a bottom plate angularly inclined forward toward each other, side fillets attached to said plates and said base and together therewith having wedge-shaped configuration, and a bar positioned at the rear of each plate adjacent said base and over which a respective one of said strips can be drawn into and through said former, the forward ends of said plates defining narrow exit slits at the sides and being cut back in their central portions to provide an enlarged opening for articles to pass through said former, and two cantilever supported guide fingers positioned between said plates and spaced opposite to each other, being tapered forward and curved inward and forward to spread said strips and to center said articles within them as they are drawn between the forward end of said plates.

6. The structure as in claim 4 wherein said endless belt extends to a point just behind the exit opening from said second chamber and is adapted to transfer articles from itself to one of said strips whereby said articles are positioned longitudinally on said strips in their final position and do not touch said strips in the regions where they are to be sealed transversely or longitudinally.

7. The structure as in claim 6 in further combination with means to supply articles in succession to said endless belt conveyor in synchronism with the operation of said machine whereby said articles are deposited within said strips longitudinally at accurately spaced intervals.

8. A packaging machine for wrapping and sealing perishable articles in thin film packages having an inert gas filling, said machine comprising a gas scrubbing mechanism including a housing enclosing an inert gas filled chamber maintained slightly above atmospheric pressure, means to admit into said chamber articles to be wrapped and to expose them to the air scrubbing action of the gas in said chamber, and to advance said articles out of said chamber, a strip former for taking two strips of thin wrapping film and for placing it around said scrubbed articles in an atmosphere of inert gas, said strip former including a prow shaped structure having a slotted and cut away front portion through which said two strips of thin wrapping film are discharged from said former with the articles therebetween and having near its rear top and bottom input slits through which said two strips of wrapping film can be drawn into said former, the width of said slits being just enough to permit gas within said former to escape outward along the surface of said films and scrub them free of air, and sealing means external to said strip former for sealing the edges of said strips.

9. The structure as in claim 8 in further combination with two cantilever-supported, tapered and curved guiding fingers positioned within said former and adapted to press said strips respectively against the top and bottom inside faces of said former and also to center articles within said strips as they are brought together through the slotted and cut away front portion of said former.

10. A high-speed, low-cost packaging machine adapted for continuous operation in ordinary room atmosphere comprising a scrubbing mechanism defining at least one gas tight chamber, conveyor means for carrying articles into said chamber single file, nozzle means for spraying inert gas within said chamber over said articles as they move past to scrub them free of any air clinging to them, a gas tight strip forming member positioned at the forward end of said scrubbing mechanism and having a wedge shaped interior narrowing toward the front, said member being adapted to receive articles from said chamber and to receive two spaced apart strips of wrapping film from the outside and to scrub them free of air before entrance into said former and then to guide said articles centrally along and between said strips as the strips are advanced longitudinally out of the forward end of said former face-to-face in a flat oval tube, said scrubbing mechanism including two large and very flexible foam rubber rollers which roll along and make a gas tight seal against the bottom portion of said mechanism but which can be compressed radially to permit passage of said articles, the first of said foam rubber rollers being positioned across the entrance of said mechanism and the second being spaced forward from the first and parallel thereto just behind said strip former, the gas pressure in said strip former being just slightly higher than the gas pressure in said chamber, the pressure in said chamber being just slightly higher than atmospheric, and heat sealing means for sealing said strips along four sides to form gas filled generally rectangular packages.

11. A packaging machine as claimed in claim 10 and including an endless belt conveyor having a plurality of parallel strands supported closely beneath said foam rubber rollers by a plurality of grooved rollers against which said foam rubber rollers make sealing contact, and a plurality of flexible sealing strips positioned adjacent to said grooved rollers and making sealing contact therewith.

12. A packaging machine for wrapping and sealing perishable articles in thin film packages having an inert gas filling, said machine comprising a gas scrubbing mechanism including a housing enclosing an inert gas filled chamber maintained slightly above atmospheric pressure, means to admit into said chamber articles to be wrapped and to expose them to the air-scrubbing action of the inert gas in said chamber and to advance the articles out of said chamber, said means comprising two large flexible rollers in said housing which are spaced apart and which serve to seal said chamber against the outside air but which permit the articles to pass into said chamber, grooved support means adjacent to said two flexible rollers, and an open-strand endless conveyor belt carried by said grooved support means and extending between said rollers, said open-strand conveyor and said grooved support means running in sealing contact with said two flexible rollers, said conveyor being adapted to move articles into said chamber and to support them over a minimum area of contact, a strip former for taking two strips of thin wrapping film and for placing it around said scrubbed articles in an atmosphere of inert gas, and sealing means external to and forward of said strip former and engaging the two strips of film with the articles therebetween after said strips of film leave said former for sealing the edges of said strips.

13. The structure as in claim 12 in further combination with two parallel pipe-like gas spray nozzles positioned above and below the upper run of said open-strand conveyor and adapted to spray inert gas around said articles as they move into said chamber whereby said articles are cleaned of any oxygen clinging to them.

14. A high-speed, low-cost packaging machine adapted for continuous production in ordinary room atmosphere of fin-type inert gas filled packages, said machine comprising a housing having an entrance opening and an exit, means positioned across the entrance opening to prevent the entrance of outside air but to permit the entrance of articles, a strip former connected to said housing and defining the exit from said housing, said former being adapted to guide the article out of said housing, said strip former having a wedge-shaped interior with upper and lower converging surfaces, the wider part of said interior receiving the articles and the narrower part of said interior defining a pair of narrow slit-like openings which are laterally spaced on opposite sides of the path of the articles with an enlarged discharge opening therebetween to provide clearance for the articles in passing out from said former, means to supply a first and a second strip of packaging material to the wider part of said former and passing along the upper and lower converging surfaces thereof, respectively, said packaging material passing out of the narrower end of said former with the edges thereof passing through the respective slit-like openings and the central portion passing through said discharge opening and being brought together face to face and distended in a flattened tube with the articles centered within it, inert gas supply means and a gas outlet connected to said supply means for feeding gas at a pressure above atmospheric into the space in said former between said strips and surrounding the articles passing out through said discharge opening, a pair of side sealing means outside of said former and positioned closely adjacent to the respective slit-like openings for sealing together the edges of said packaging material after it has progressed out from the former, said inert gas flowing outwardly between the edges of the packaging material adjacent to the former for preventing the entrance of air into the package before the sealing of the side edges is effectuated, and transverse sealing means external to said housing and positioned beyond said side sealing means in the direction of travel of the packaging material for sealing together said packaging material transversely between the articles therein.

15. A high-speed, low-cost packaging machine as claimed in claim 14 and wherein said former includes laterally spaced converging guide fingers adapted to straddle the articles passing through said former for centering the articles within said former, said guide fingers also holding the central region of the upper and lower strips of packaging material spaced apart for receiving the centered articles therebetween.

References Cited in the file of this patent

UNITED STATES PATENTS

| | | |
|---|---|---|
| 2,113,636 | Vogt | Apr. 12, 1938 |
| 2,384,494 | Schutter | Sept. 11, 1945 |
| 2,546,721 | Campbell | Mar. 27, 1951 |
| 2,597,041 | Stokes | May 20, 1952 |
| 2,611,225 | Williams | Sept. 23, 1952 |
| 2,633,684 | Rohdin | Apr. 7, 1953 |
| 2,718,105 | Ferguson et al. | Sept. 20, 1955 |
| 2,919,990 | Podlesak et al. | Jan. 5, 1960 |